United States Patent Office 3,141,731
Patented July 21, 1964

3,141,731
METHOD OF TREATING SILVER NITRATE SOLUTIONS
Herbert J. Dietz, Rochester, N.Y., assignor to Eastman Kodak Company, Rochester, N.Y., a corporation of New Jersey
No Drawing. Filed June 15, 1962, Ser. No. 202,695
4 Claims. (Cl. 23—102)

This invention relates to the treatment of silver nitrate solutions. More particularly, this invention relates to the treatment of aqueous silver nitrate solutions to remove therefrom a substantial proportion of metal contaminants contained therein.

Aqueous silver nitrate solutions are usually prepared by dissolving silver bullion in nitric acid. Depending primarily on the degree of purity of the silver bullion, the resulting silver nitrate solution will usually contain varying amounts of metals such as lead, nickel, gold, mercury, zinc, manganese, copper, iron, bismuth, palladium, tin, magnesium, and the like. The metals will usually be present in the solution in their ionized form.

For certain applications it is desirable to remove or to at least reduce substantially the amount of the metal contaminants present in the silver nitrate solution.

Thus, for example, silver halide emulsions used in the photographic art are often prepared by precipitating silver halides in an aqueous colloid medium. Aqueous silver nitrate solutions are used as the source of silver ions in the preparation of the silver halides and it is desirable that the solutions used be as pure as possible to insure optimum photographic properties in the silver halides derived therefrom.

Various methods have been proposed for treating silver nitrate solutions to remove metal contaminants therefrom, but these methods have not proved to be entirely satisfactory because they are either tedious and time consuming, or are not economically feasible, or do not provide an aqueous silver nitrate solution having the desired degree of purity for use in the photographic art.

An object of this invention is an improved process for removing from aqueous silver nitrate solutions a substantial proportion of metal contaminants contained therein.

Another object of this invention is an aqueous silver nitrate solution having a high degree of purity.

Other objects of this invention will, in part, be obvious and will, in part, appear hereinafter.

For a complete understanding of the nature and the objects of this invention, reference is made to the following detailed description.

It is known to treat aqueous silver nitrate solutions with silver oxide to improve the purity thereof. While silver oxide has proved to be effective in removing a substantial proportion of certain impurities from aqueous silver nitrate solutions, it has not proved to be entirely effective in removing therefrom a substantial amount of impurities such as lead, nickel, manganese, zinc, and mercury.

Broadly, this invention is directed to a double treatment of aqueous silver nitrate solution which comprises a first treatment with silver oxide and a subsequent or second treatment with iron and silver oxide.

It has been determined that the method of this invention is most effective when the aqueous silver nitrate solution to be treated is comprised of, by weight, from about 55 percent to 65 percent of silver nitrate based on the total weight of the solution, with optimum results being obtained when the aqueous silver nitrate solution contains about 60 percent by weight of silver nitrate.

The method of this invention comprises (1) treating a metal contaminated aqueous silver nitrate solution with silver oxide in an amount sufficient to provide a solution having a pH of from about 5.8 to 6.3 and whereby there is formed a precipitate which includes precipitated metals, metal hydroxides, and any excess or undissolved silver oxide, (2) separating the silver nitrate solution and the precipitate, (3) heating the thus separated silver nitrate solution to a temperature of from about 75° C. to 95° C., (4) treating the heated silver nitrate solution with iron and an amount of silver oxide sufficient to maintain the pH of the solution between about 5.8 to 6.3 and whereby a precipitate is formed which will include any excess silver oxide, and (5) separating the aqueous silver nitrate solution and the precipitate.

The recovered aqueous silver nitrate solution can be purified further, if desired, by passing it through a microporous filter such, for example, as a stainless steel microporous material, an inert microporous clay ceramic material, or fritted glass.

The treatment in step (1) can be accomplished conveniently by adding, preferably with stirring, silver oxide to the silver nitrate solution maintained at room temperature (about 23° C.) until the pH of the solution is from about 5.8 to 6.3. The amount of silver oxide required will depend on the pH of the untreated solution. It has been determined in practice that an aqueous silver nitrate solution containing, by weight, from about 55 percent to 65 percent of silver nitrate will have a pH of from about 1 to 5.

The precipitate formed as a result of the silver oxide addition, and any excess silver oxide, are allowed to settle out and is subsequently separated from the aqueous silver nitrate solution. This can be accomplished by any convenient means such as by decantation of the solution or by filtration.

At this stage, a substantial proportion of certain metal impurities have been removed from the aqueous silver nitrate solution. However, as previously set forth, the silver oxide treatment is not effective in reducing substantially the amount of lead, nickel, mercury, zinc, and manganese that might be present in the aqueous silver nitrate solution.

The thus-treated aqueous silver nitrate solution is then heated to a temperature of from about 75° C. to 95° C., a temperature of about 80° C. being preferred, and then further treated by adding thereto iron nitrate, also known as ferric nitrate. The iron nitrate is conveniently added as an aqueous solution thereof. The iron nitrate will lower somewhat the pH of the solution and in order to maintain the pH of the solution between about 5.8 and 6.3, additional silver oxide is added.

The amount of iron nitrate added to the solution will be in an amount sufficient to provide therein iron, in its ionized form, in an amount equal to from about 100 parts to 1,000 parts by weight for each one million parts by weight of silver nitrate in the solution. The preferred amount of iron is 200 parts by weight for each one million parts by weight of silver nitrate.

While it is preferred to use iron nitrate as a source of iron in carrying out this invention, other sources of iron can be used. Thus, elemental iron, in finely divided form, can be used and also iron hydroxide can be employed satisfactorily.

The well-known cementing action of metallic iron on silver solutions can be employed to provide a convenient and economical source of iron nitrate. For example, to provide an amount of iron nitrate sufficient to treat 400 gallons of a 60 percent by weight aqueous silver nitrate solution at the preferred amount of 200 parts by weight of iron for each one million parts by weight of silver nitrate, one pound two ounces of iron filings are added to one gallon of a 60 percent by weight silver nitrate solution. To hasten the reaction, the mixture is stirred and warmed to a temperature of about 70° C.

to about 82° C. After the iron has gone into solution, usually about one hour, the solution is decanted and then added to the silver nitrate solution to be treated.

The above described double treatement is an effective means for controlling the amount of metal contaminants in a silver nitrate solution. The first treatment with silver oxide is effective in controlling the amount of all contaminating metals except the metals nickel, lead, mercury, zinc and manganese. The second treatment with iron effectively reduces the amounts of these metals present.

The following examples illustrate this double treatment. All parts are by weight unless otherwise indicated.

*Example I*

About 300 gallons of a 60% by weight aqueous silver nitrate solution containing 80 parts of lead and 8 parts of nickel for each one million parts of silver nitrate and 42 parts of mercury for each one billion parts of silver nitrate is treated with silver oxide to provide a solution having a pH of about 6.2. A precipitate is formed and separated from the solution by filtration. The solution is heated to about 80° C. and an aqueous solution of iron nitrate is added thereto in an amount sufficient to provide in the solution about 200 parts of iron for each one million parts of silver nitrate. Additional silver oxide is added to the solution so as to maintain the pH thereof at about 6.2. The resulting mixture is stirred for about 2 hours during which time the temperature thereof is maintained at about 80° C. The solution is then cooled to room temperature and a precipitate that is formed is separated from the solution by filtration. An analysis of the resulting solution shows 1 part of lead and 3 parts of nickel for each one million parts of silver nitrate and 24 parts of mercury for each one billion parts of silver nitrate.

*Example II*

About 88 cubic centimeters of a 60% by weight aqueous silver nitrate solution containing about 100 parts of manganese and about 50 parts of zinc for each one million parts of weight of silver nitrate is treated with silver oxide. Silver oxide is added to the solution in an amount sufficient to provide a pH of about 6.2. The resulting mixture is stirred for about 30 minutes during which time the mixture is maintained at room temperature (about 23° C.). A precipitate is formed and removed by filtration. The filtrate is then treated with iron by adding thereto an aqueous solution of iron nitrate in an amount sufficient to provide 100 parts of iron in the filtrate for each one million parts of silver nitrate. Additional silver oxide is added to the solution or filtrate so as to maintain the pH at about 6.2. The resulting mixture is heated to about 80° C. and this temperature is maintained while the mixture is stirred for one hour. The mixture is cooled to room temperature and a precipitate which is formed is removed by filtration. The resulting filtrate contains less than one part of manganese and about 3 parts of zinc for each one million parts of silver nitrate.

While it is preferred that the aqueous silver nitrate solution to be treated be first treated with silver oxide, it has been determined that a single treatment with iron and silver oxide results in effective control of most metal impurities. However, significantly larger total quantities of iron and silver oxide are required in this single treatment than when the aqueous silver nitrate solution is first treated with silver oxide and subsequently treated with iron and silver oxide.

In the single treatment with iron and silver oxide it is preferred to employ iron in an amount of from about 100 to 1000 parts by weight for each one million parts by weight of silver nitrate present in the solution. Silver oxide is added to the solution in an amount sufficient to provide a solution having a pH of from about 5.8 to 6.3.

The source of iron can be iron nitrate, elemental iron, or iron hydroxide. Iron nitrate in aqueous solution is preferred. The treatment can be carried out at room temperature; however, it is preferred that the solution be maintained at about 75° C. to 95° C. during treatment. The precipitate that is formed is subsequently removed by filtration.

A substantial amount of lead and mercury are removed by this single treatment. The preferred concentration of the silver nitrate solution to be treated is from about 55% to 65% by weight. If the silver nitrate solution is treated at room temperature, then the amount of iron employed should be about 1,000 parts by weight for each one million parts by weight of silver nitrate. Treatment of a heated solution requires less iron for effective removal of impurities and in addition more effective removal of nickel is accomplished.

The following examples are illustrative of this single treatment. All parts are by weight unless otherwise indicated.

*Example III*

About 80 cubic centimeters of an aqueous silver nitrate solution containing, by weight, about 60 percent silver nitrate is placed in a glass container. This solution contains, for each one million parts of silver nitrate, 100 parts of lead, and 20 parts of nickel. The solution contains also 40 parts of mercury for each one billion parts of silver nitrate. An aqueous solution of ferric nitrate is added to the silver nitrate solution in an amount sufficient to provide, for each one million parts of silver nitrate, 500 parts of iron. Silver oxide is then added to the container in an amount sufficient to provide a solution having a pH of a least about 6.2. The resulting mixture is stirred for about 4 hours at room temperature and subsequently filtered. The resulting silver nitrate solution contains, for each one million parts of silver nitrate, 30 parts of lead, 20 parts of nickel, and, for each one billion parts of silver nitrate, 17 parts of mercury. It will be noted that the amount of lead and mercury in the aqueous silver nitrate solution has been reduced while the amount of nickel therein has not been reduced.

*Example IV*

Substantially the same procedure at that described in Example III is followed with the exception that iron nitrate is added in an amount sufficient to provide 1,000 parts of iron in the silver nitrate solution. An analysis of the filtered solution shows 15 parts of lead and 20 parts of nickel for each one million parts of silver nitrate, and 14 parts of mercury for each one billion parts of silver nitrate. Thus it will be seen that at room-temperature conditions, an increase in the amount of iron reduces substantially the amount of lead in the silver nitrate solution and, to a lesser degree, the amount of mercury present therein. However, the amount of nickel contained therein was not affected by the increase in the amount of iron added.

*Example V*

About 88 cubic centimeters of an aqueous silver nitrate solution containing about 60 percent by weight of silver nitrate is placed in a glass container. The aqueous silver nitrate solution contains about 100 parts of lead and 10 parts of nickel for each one million parts of silver nitrate, and 40 parts of mercury for each one billion parts of silver nitrate. Aqueous ferric nitrate solution is added in an amount sufficient to provide 1,000 parts of iron for each one million parts of silver nitrate. The resulting solution is heated to about 80° C. and silver oxide is added in an amount sufficient to provide a solution having a pH of about 6.2. The solution is stirred for about 2 hours while the temperature of the mixture is maintained at about 80° C. This solution, after cooling to room temperature, is filtered to separate the silver nitrate solution from the precipitated solids. The resulting aqueous silver nitrate solution contains 4 parts of lead and 2 parts of nickel for each one million parts of silver nitrate and 26 parts of mercury for each one billion parts of silver nitrate. Thus it will be seen that by heating the solution to a temperature of about 80° C., the amounts of nickel and lead present in the aqueous silver nitrate solution are reduced substantially.

The above examples illustrate the effectiveness of the removal of lead, nickel, and mercury from an aqueous silver nitrate solution employing what is referred to above as the single treatment.

*Example VI*

A solution of silver nitrate is prepared from 99.9 silver bullion by dissolving the silver bullion in 59 percent commercial grade nitric acid using about 100 parts by weight of bullion to about 152 parts by weight of nitric acid. Additional water is added to this aqueous silver nitrate solution to provide a solution comprised of by weight 60 percent of silver nitrate. The temperature of the silver nitrate solution is maintained at room temperature and there is added thereto an amount of silver oxide to bring the pH of the resulting solution to about 6.2. A precipitate is formed which is allowed to settle to the bottom of the vessel and the aqueous silver nitrate solution decanted therefrom and conveyed to a second container where it is heated to a temperature of about 80° C. After this temperature of 80° C. has been reached, there is added to the hot aqueous silver nitrate solution, ferric nitrate in an amount sufficient to provide about 200 parts of iron for each one million parts of silver nitrate in the solution and an amount of silver oxide sufficient to maintain the pH of the solution at about 6.2. A precipitate is formed which is allowed to settle out and the silver nitrate solution is decanted into another vessel. This treated aqueous silver nitrate solution is filtered through a stainless steel microporous filter and then stored in a suitable storage vessel. The resulting aqueous silver nitrate solution is of sufficient purity for use in preparing silver halides for use in the photographic art.

It has been determined also that mercury can be effectively removed from aqueous silver nitrate solutions by the sulfate ion. Silver sulfate is the preferred source of sulfate ion. The sulfate treatment is most effective on aqueous silver nitrate solutions which contain from 30% to 40% by weight of silver nitrate based on the total weight of the solution.

It is to be understood that the above description and examples are illustrative of this invention and not a limitation thereof.

I claim:
1. A process which comprises
   (1) treating an aqueous silver nitrate solution containing, by weight, from about 55% to 65% of silver nitrate and which contains small amounts of metal impurities with silver oxide in an amount sufficient to provide a solution having a pH of from about 5.8 to 6.3 and whereby a precipitate is formed,
   (2) separating the silver nitrate solution and the precipitate,
   (3) heating the thus separated silver nitrate solution to a temperature of from about 75° C. to 95° C.
   (4) treating the heated solution with iron in an amount equal to from about 100 parts to 1000 parts by weight for each one million parts by weight of silver nitrate and silver oxide in an amount sufficient to maintain the pH of the solution at from about 5.8 to 6.3 and whereby a precipitate is formed, and
   (5) separating the silver nitrate solution and the precipitate.
2. A process which comprises
   (1) treating an aqueous silver nitrate solution containing by weight about 60% silver nitrate and which contains small amounts of metal impurities with silver oxide in an amount sufficient to provide a pH of from about 5.8 to 6.3 and whereby a precipitate is formed,
   (2) separating the silver nitrate solution and the precipitate,
   (3) heating the thus separated silver nitrate solution to a temperature of about 80° C.,
   (4) treating the heated solution with an aqueous solution of iron nitrate in an amount sufficient to provide in the solution 200 parts by weight of iron for each one million parts by weight of silver nitrate and silver oxide in an amount sufficient to maintain the pH of the solution at from about 5.8 to 6.3 and whereby a precipitate is formed, and
   (5) separating the silver nitrate solution and the precipitate.
3. A process which comprises
   (1) heating to a temperature of from about 75° C. to 95° C. an aqueous silver nitrate solution which contains, by weight, from about 55% to 65% silver nitrate and which contains metal impurities,
   (2) adding to the heated solution iron in an amount equal to from about 100 parts to 1000 parts by weight for each one million parts by weight of silver nitrate and silver oxide in an amount sufficient to provide a solution having a pH of from about 5.8 to 6.3 and whereby a precipitate is formed, and
   (3) separating the solution and the precipitate.
4. A process which comprises
   (1) heating to a temperature of about 80° C. an aqueous silver nitrate solution containing about 60% by weight of silver nitrate and small amounts of metal impurities,
   (2) adding to the heated solution an aqueous solution of iron nitrate in an amount sufficient to provide in the solution from about 500 to 1000 parts by weight of iron for each one million parts by weight of silver nitrate and silver oxide in an amount sufficient to provide a solution having a pH of from about 5.8 to 6.3 and whereby a precipitate is formed, and
   (3) separating the solution and the precipitate.

References Cited in the file of this patent
UNITED STATES PATENTS

| | | |
|---|---|---|
| 2,543,792 | Marasco et al. | Mar. 6, 1951 |
| 2,614,029 | Moede | Oct. 14, 1952 |
| 2,940,828 | Moede | June 14, 1960 |